United States Patent
Crane et al.

(10) Patent No.: US 7,313,543 B1
(45) Date of Patent: Dec. 25, 2007

(54) SYSTEM AND METHOD FOR DIVIDING A REMITTANCE AND DISTRIBUTING A PORTION OF THE FUNDS TO MULTIPLE INVESTMENT PRODUCTS

(75) Inventors: Suzanne P. Crane, New Hope, MN (US); Marcus Sheire, St. Paul, MN (US); Mark D. Sweazy, Minnetonka, MN (US); Bonnie Hein, Brooklyn Park, MN (US); Joan Prairie, Minneapolis, MN (US); Rockwell Metcalf, New York, NY (US)

(73) Assignee: Ameriprise Financial, Inc., Minneapolis, MN (US)

( * ) Notice: Subject to any disclaimer, the term of this patent is extended or adjusted under 35 U.S.C. 154(b) by 0 days.

(21) Appl. No.: 09/415,632

(22) Filed: Oct. 12, 1999

(51) Int. Cl.
*G06Q 40/00* (2006.01)
(52) U.S. Cl. .................. 705/39; 705/35; 705/36 R
(58) Field of Classification Search ............ 705/1, 705/10–44
See application file for complete search history.

(56) References Cited

U.S. PATENT DOCUMENTS

| | | | |
|---|---|---|---|
| 4,346,442 A | * 8/1982 | Musanno | ........... 364/408 |
| 4,376,978 A | 3/1983 | Musmanno | |
| 4,597,046 A | 6/1986 | Musmanno et al. | |
| 4,694,397 A | * 9/1987 | Grant et al. | ........... 705/42 |
| 4,750,119 A | * 6/1988 | Cohen et al. | ........... 705/14 |
| 4,751,640 A | 6/1988 | Lucas et al. | |
| 4,774,663 A | * 9/1988 | Musanno et al. | ........... 364/408 |
| 4,823,265 A | 4/1989 | Nelson | |
| 5,262,942 A | 11/1993 | Earle | |
| 5,483,445 A | 1/1996 | Pickering | |
| 5,717,989 A | 2/1998 | Tozzoli et al. | |
| 5,745,706 A | 4/1998 | Wolfberg et al. | |
| 5,761,650 A | 6/1998 | Munsil et al. | |

(Continued)

FOREIGN PATENT DOCUMENTS

EP 0 308 224 * 3/1989

(Continued)

OTHER PUBLICATIONS

Card News, Jun. 22, 1998, Philips Business Information, Inc., pp. 1-2.*

*Primary Examiner*—Frantzy Poinvil
(74) *Attorney, Agent, or Firm*—Snell & Wilmer L.L.P.

(57) ABSTRACT

A known charge card billing system communicates with an investment broker system, wherein the investment broker system includes an instruction arrangement database, payment hierarchy and an investment account. An interested cardholder suitably appoints the charge card administrator as a processing agent to collect and promptly remit the cardholder's voluntary, periodic payments for investment into preselected investment products, such as, for example, mutual fund shares, fixed annuities, variable annuities, CDs, insurance, certificates, equities and/or the like. The billing system distributes a billing statement at the end of each month, wherein the statement includes all of the charges for that month and a reminder to remit an additional dollar amount for the preselected investments. The cardholder then sends a single payment for the charges and the investments to the charge card administrator. After receiving the payment, the system appropriately unbundles the payment and distributes the remitted payment to the card account to satisfy the captured financial events and to the investment broker system for the purchase of investment products.

12 Claims, 9 Drawing Sheets

U.S. PATENT DOCUMENTS

| | | | |
|---|---|---|---|
| 5,787,404 A * | 7/1998 | Fernandez-Holmann | 705/35 |
| 5,826,245 A * | 10/1998 | Sandberg-Diment | 705/44 |
| 6,018,722 A * | 1/2000 | Ray et al. | 705/36 |
| 6,070,153 A * | 5/2000 | Simpson | 705/36 |
| 6,112,191 A * | 8/2000 | Burke | 705/41 |
| 6,202,054 B1 * | 3/2001 | Lawlor et al. | 705/42 |
| 6,216,115 B1 * | 4/2001 | Barrameda et al. | 705/40 |

FOREIGN PATENT DOCUMENTS

| | | | |
|---|---|---|---|
| WO | WO 95/23379 | * | 8/1995 |
| WO | WO 98/09260 | | 3/1998 |
| WO | WO 98/26386 | | 6/1998 |

* cited by examiner

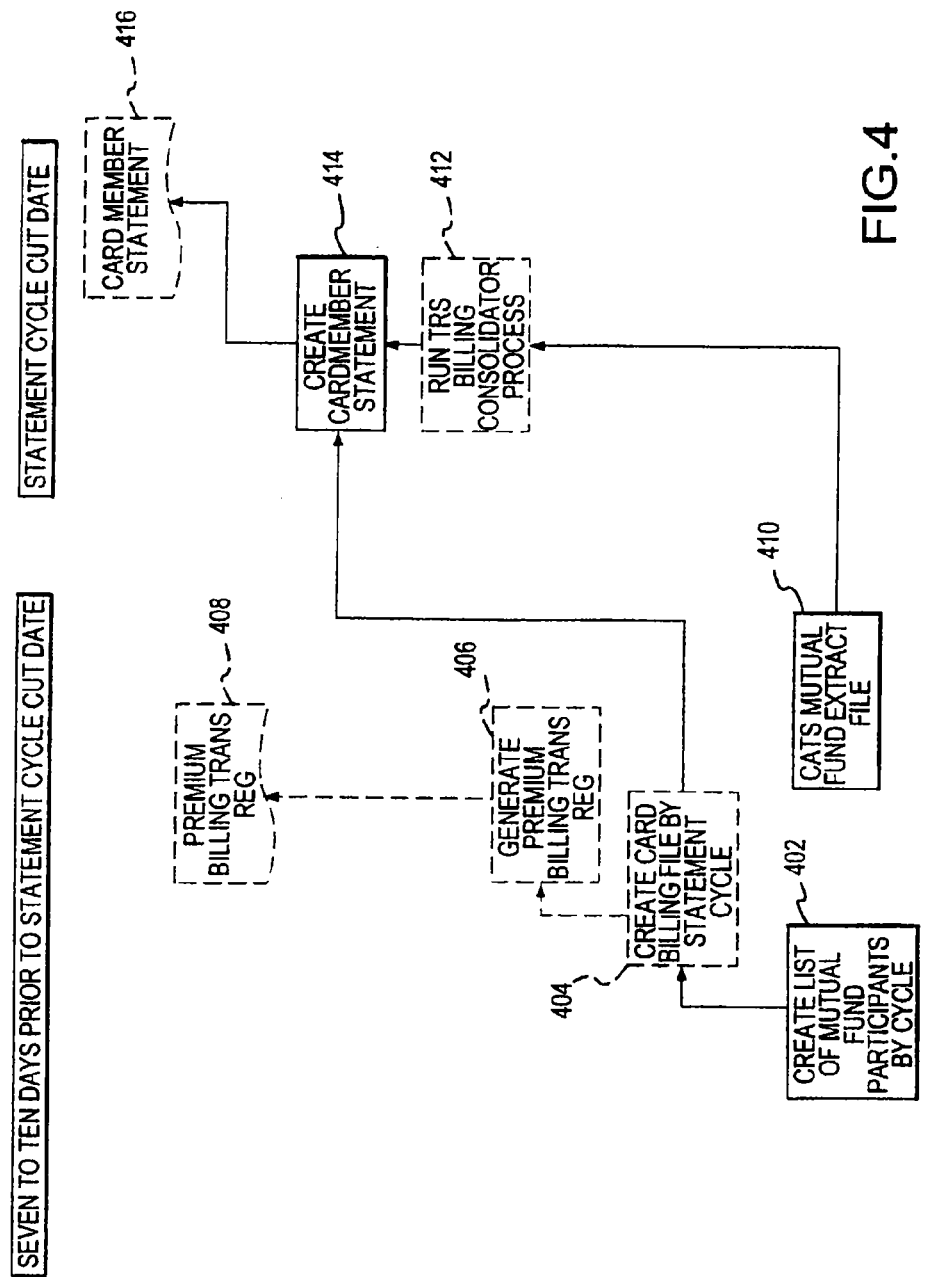

PERSONAL CARD STATEMENT OF ACCOUNT

705    CLOSING DATE    ACCOUNT NUMBER    PAGE 1 OF 4
DECEMBER 20, 1996    3720

| PREVIOUS CARD BALANCE $ | CARD PAYMENTS/CREDITS $ | NEW CARD CHARGES $ | NEW CARD BALANCE $ | S&T AND/OR SPA MINIMUM PAYMENT $ | MINIMUM AMOUNT DUE $ |
|---|---|---|---|---|---|
| 233.09 | -233.09 | 157.50 | 157.50 | 20.00 | 177.50 |

STATEMENT INCLUDES PAYMENTS AND CHARGES RECEIVED BY DECEMBER 20, 1996.
*INDICATES POSTING DATE.

JOIN US IN THE CHARGE AGAINST HUNGER IN NOV. & DEC. HELP PROVIDE A MEAL FOR SOMEONE WHO IS HUNGRY. FOR MORE INFO. PLEASE REFER TO CARDMEMBER VALUES OR CALL (888)-4-TO-GIVE.

TERMS-PAYABLE IN FULL UPON RECEIPT OF STATEMENT.

FOR FAST BALANCE AND PAYMENT INFORMATION, CALL OUR AUTOMATED SERVICE LINE AT 1-800-292-2639 USING A TOUCH TONE PHONE. PLEASE HAVE YOUR ACCOUNT NUMBER READY. IF YOU HAVE A QUESTION ABOUT YOUR ACCOUNT. CALL 1-800-528-4800 (24 HOURS/7 DAYS).

PLEASE REFER TO PAGE 4 FOR IMPORTANT INFORMATION REGARDING YOUR CARD ACCOUNT

SUMMARY OF ACCOUNT:    TOTAL BALANCE    $455.99
SIGN & TRAVEL AND/OR    MINIMUM PAYMENT    $20.00
SPECIAL PURCHASE ACCOUNT    SEE THE ENCLOSED SIGN & TRAVEL AND/OR SPECIAL PURCHASE ACCOUNT STATEMENT OF ACCOUNT FOR COMPLETE TRANSACTION DETAIL.

| CARD DETAIL | AMOUNT $ |
|---|---|
| CARD PAYMENTS | |
| DECEMBER 7, 1996* | -150.79 |
| 215.44 PYMT RECVD-THANK YOU | |
| 64.65 APPLIED TO SIGN & TRAVEL/SPA | |
| TOTAL OF CARD PAYMENTS | -150.79 |

CARD TRANSACTIONS FOR
CARD 3720

NOVEMBER 14, 1996    22.15
LA PENICHE INC NEW ORLEANS LA
FOOD/BEVERAGE
REFERENCE 000000105840 ROC NUMBER 0000105840

NOVEMBER 26, 1996    20.70
LOUISIANA SUPERDOME NEW ORLEANS LA
CHAIN ADDITION
REFERENCE 00014031

} 705

↓ PLEASE FOLD ON THE PERFORATION BELOW, DETACH AND RETURN WITH YOUR PAYMENT ↓    CONTINUED ON REVERSE

PAYMENT COUPON    ACCOUNT NUMBER    PLEASE PAY BY:
   3720    JANUARY 14, 1997

MINIMUM AMOUNT DUE
$177.50

PLEASE ENTER ACCOUNT NUMBER ON ALL CHECKS AND CORRESPONDENCE. PAYABLE IN U.S. DOLLARS UPON RECEIPT WITH A CHECK DRAWN ON A BANK IN THE U.S. OR MONEY ORDER, PROCESSABLE THROUGH THE U.S. BANKING SYSTEM.

70153-3062

MAIL PAYMENT TO:    AMERICAN EXPRESS TRS
   SUITE 0001
   CHICAGO IL 60679-0001

CHECK HERE IF ADDRESS OR TELEPHONE NUMBER HAS CHANGED. NOTE CHANGES ON REVERSE SIDE. ☐

| CARD DETAIL CONTINUED | AMOUNT $ | PAGE 2 OF 4 |
|---|---:|---|
| NOVEMBER 30, 1996<br>TRAVEL & LEISURE 800-888-8728 NY, NY<br>DU 1961029 SUBSCRIPTION REFUND | -33.00 | |
| DECEMBER 1, 1996<br>VERA CRUZ NEW ORLEANS LA<br>FOOD/BEVERAGE<br>FOOD/BEV   17.74<br>TIP   12.26<br>REFERENCE 00010174 | 30.00 | 705 |
| DECEMBER 2, 1996<br>CREDIT PENDING INVESTIGATION OF DISPUTE | -24.65 | |
| DECEMBER 2, 1996<br>GEVALIA KAFFE 800-438-2542 IA<br>112996 57 COFFEE SHIPMENT | -24.65 | |
| DECEMBER 3, 1996<br>REBILLING OF OUR PREV. ISSUED CREDIT | 24.65 | |
| DECEMBER 11, 1996<br>PRIVELEGED ASSETS MINNEAPOLIS MN<br>DEC CONTRIBUTION<br>PRIVELEGED ASSETS<br>CERTIFICATE # 9555854655<br>FOR INQUIRIES CALL 1-800-633-4003<br>REFERENCE 9555854655 ROC NUMBER 9555864655 | 60.00 | ← 710 |
| TOTAL FOR<br>NEW CHARGES 157.50 NEW CREDIT -82.30 | 75.20 | |
| TOTAL OF CARD ACTIVITY | NEW CARD CHARGES  157.50<br>NEW CARD PAYMENTS/CREDITS  -233.09 | |

CHANGE OF ADDRESS
IF CORRECT ON FRONT
DO NOT USE

CONTINUED ON NEXT PAGE

NAME
COMPANY NAME
STREET ADDRESS
CITY-STATE
ZIP CODE
AREA CODE AND HOME PHONE NUMBER
AREA CODE AND WORK PHONE NUMBER

FIG.7B

SYSTEM AND METHOD FOR DIVIDING A REMITTANCE AND DISTRIBUTING A PORTION OF THE FUNDS TO MULTIPLE INVESTMENT PRODUCTS

REFERENCE TO RELATED DOCUMENTS

A portion of the disclosure of this patent document contains material to which a claim for copyright is made. The copyright owner has no objection to the facsimile reproduction by anyone of the patent document or patent disclosure, as it appears in the Patent and Trademark Office patent file or records, but reserves all other copyrights whatsoever.

TECHNICAL FIELD

The present invention relates generally to a system and method for applying funds to investment products, and more particularly, to a system and method for using a transaction card billing system to allow cardholders to make predetermined investment contributions to multiple investment products on a regular basis.

BACKGROUND ART AND TECHNICAL PROBLEMS

An increasing number of people are investing their money in a variety of investment products. For many of these people, a prudent investment strategy is to fund investment products, such as annuities, mutual funds, brokerage accounts, CDs, insurance, certificates, equities and the like, on a regular basis. However, even if people send a check to fund an investment product, the remittance process is typically time consuming and people often lack the discipline required to fund investment accounts on a regular basis. Moreover, people already typically write numerous checks each month to pay for transaction cards, utilities, investment products and other recurring expenses.

Due to the inefficiencies associated with numerous required remittances, people desire to avoid the hassles of multiple payments each month to various entities. Accordingly, a system which combines payments owed to selected entities and which relieves the consumer of the burden of having to proactively deposit separate investment funds each month is needed. Thus, a system which conveniently combines transaction card payments with investment product payments would help to solve some of the existing remittance problems and satisfy unmet consumer needs. The combined system would also provide substantial benefits to the investment product brokers by increasing the percentage of cardholders who purchase investment products. Furthermore, the combination of transaction card payments and investment product payments would benefit the broker by allowing the broker to analyze the cardholder investment decision-making process and suggest other investment options to the cardholder.

With respect to transaction cards, an increasing number of people use transaction cards each month, such as credit cards, charge cards, debit cards and the like, wherein the cards are primarily designed as a method of payment, a bill paying mechanism, or a means of financing the purchases of goods and services. Therefore, with respect to implementation of a combined system, most transaction card companies have already developed efficient billing and remittance systems, so supplementing the existing billing systems with investment product billing and allocation functionality would most likely be a relatively modest software and hardware investment.

SUMMARY

Prior to beginning the investing account arrangement with a transaction card company, the cardholders notify an investment broker system of their investment product selection, the total amount they intend to invest on a monthly basis, and the specific investment amount for each investment product. The investment broker system populates an investment instruction arrangement database with the cardholder information, namely the selected investment products and investment amounts. The charge card administrator, using an administrative system, then incorporates the cardholders' intended investment amounts onto its respective charge card billing statements as a reminder to remit the investment amount along with the regular charge card payment. After receiving the statement, the cardholder sends a single check for both regular charge card purchases and for the investment purchases.

When the cardholder payment is received by the charge card administrator, the payment processing system determines, based on the cardholder's preselected investments, how each of the cardholders' payments should be allocated between regular charge card payments and investment amounts, namely through the use of a payment hierarchy which includes a predetermined set of allocation rules. The charge card administrator's payment processing system then electronically forwards the appropriate investment amount request to the broker to execute the investments based upon another payment hierarchy related to the allocation of the investment funds among the investment products. After executing the investment, the broker system notifies the cardholder of the price at which the investments were purchased by the system.

BRIEF DESCRIPTION OF THE DRAWING FIGURES

The subject invention will hereinafter be described in conjunction with the appended drawing figures, wherein like numerals denote like elements, and:

FIG. 4 is an exemplary flow diagram showing a more detailed method of the cardholder billing process for mutual funds in accordance with one embodiment of the present invention;

FIG. 7A shows an exemplary billing statement summary page in accordance with one embodiment of the present invention; and, FIG. 7B shows an exemplary billing statement detail page in accordance with one embodiment of the present invention.

DETAILED DESCRIPTION OF PREFERRED EXEMPLARY EMBODIMENTS

Figure 1:
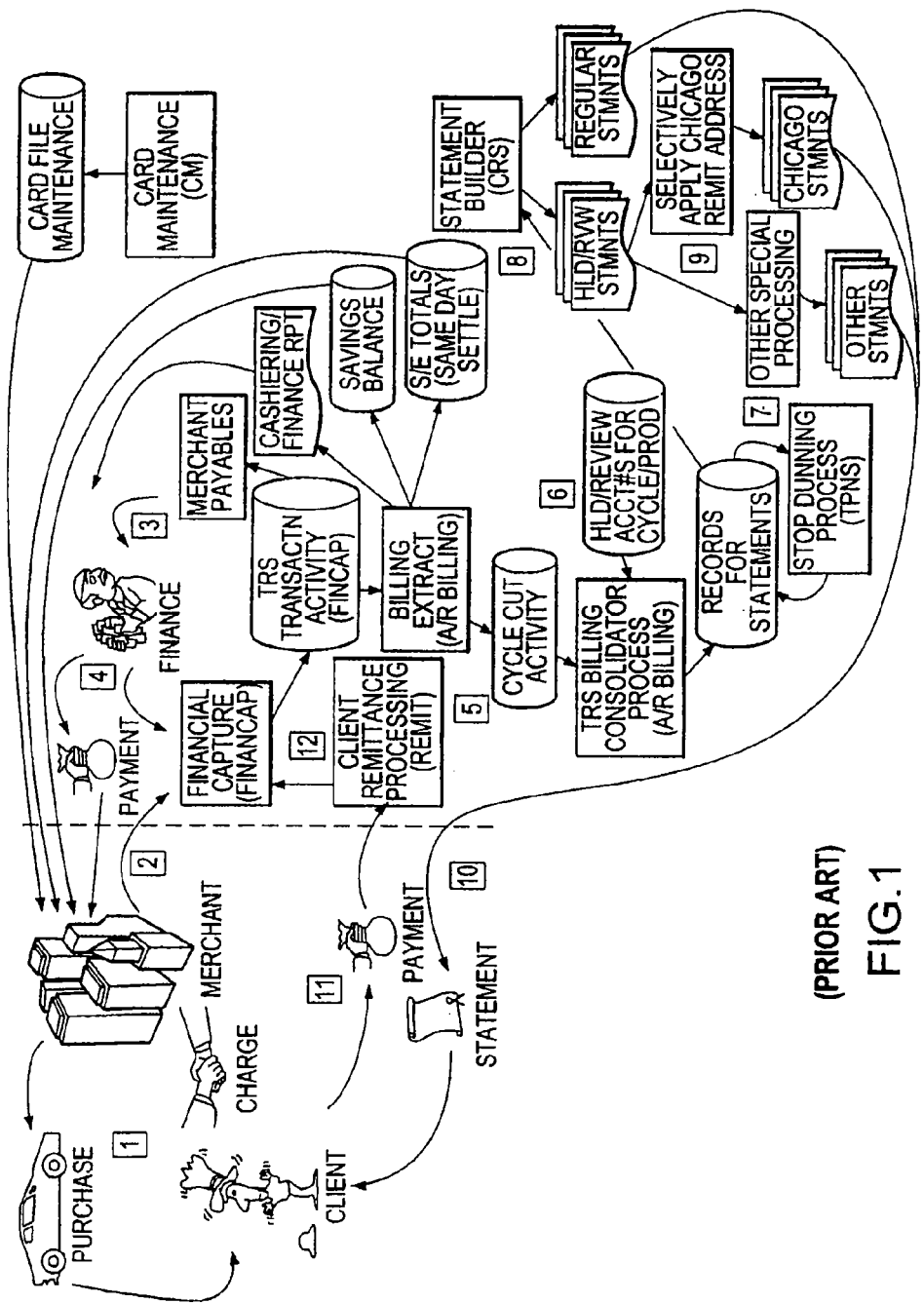
FIG. 1 is an exemplary block diagram showing a prior art card purchase/payment process including billing remittance and settlement.

As background, FIG. 1 shows an exemplary flow diagram of a typical prior art transaction card payment processing system including the billing, remittance and settlement processes. To start the billing process, a client purchases an item at a merchant by charging the item on a charge card (step 1). The merchant suitably reports the charge to the financial capture system of the charge card administrator (step 2), then the merchant payable system within the charge card system processes the pending payables and reports the payables to the charge card finance department so that the finance department knows the amount of funds to provide back to the merchant (step 3). The finance department then wires payment to the merchant and records the payment (financial event) in the financial capture system (step 4).

The charge card system also extracts the billing, remittance and adjustment information from the financial capture system, so that the accounts receivable billing system is able to group the new purchases with prior remittances and adjustments which occurred since the prior billing period (step 5). If appropriate, a hold and review code is assigned to a particular account number (step 6). The billing records are then scanned by the collection system, and if appropriate, adjustments are made to the billing records such as, for example, initiating a collection process for overdue amounts, canceling finance charges for overdue amounts, reversal of outstanding bills if the bills are over two months old, preparing a letter to the client explaining the reversal of the account, preparing a 60-day report letter to the client and/or the like (step 7). After completing the account analysis, the statement system populates the billing statements (step 8) and appropriately addresses the billing statements (step 9), then the billing statements are suitably transmitted to the clients (step 10).

After receiving the billing statement, the cardholder remits a check, electronic payment or other negotiable instrument to a payment center of the charge card administrator to cover the previously incurred charges (step 11). Upon receiving the remittance payment from the cardholder, the remittance processing system transmits a remittance receivables file to the financial capture system to settle the account (step 12).

Figure 2:
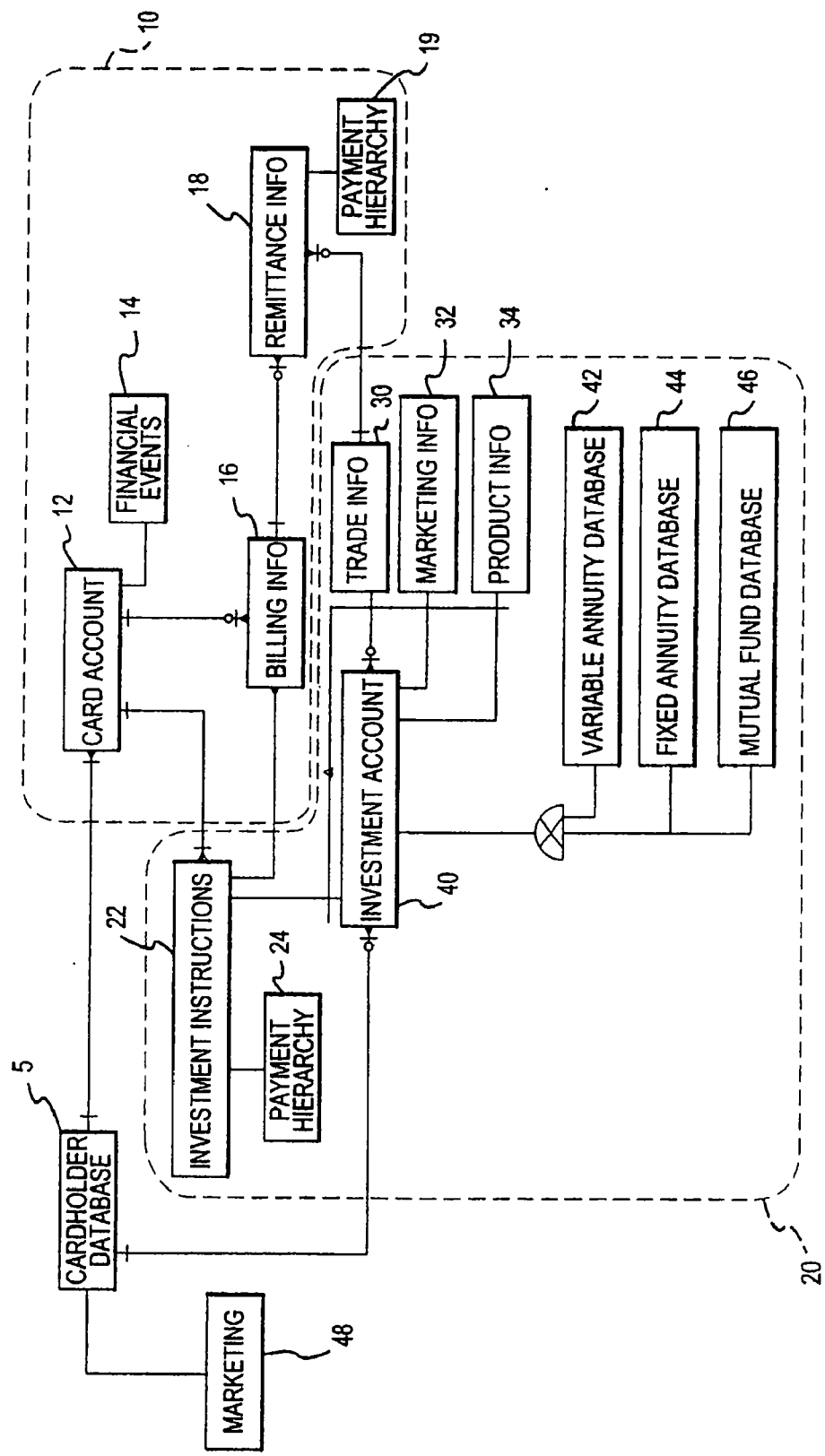
FIG. 2 is an exemplary logical data model of the data relationships and rules in accordance with one embodiment of the present invention.

In accordance with a preferred embodiment, the present system includes a charge card billing system 10 that communicates with an investment broker system 20 as illustrated in FIG. 2 and as explained more fully below. One skilled in the art will appreciate that, as used herein, a "cardholder" includes any person or entity which uses a transaction card and participates in the present system. Similarly, a "transaction card" or "card" includes any device or code suitably configured to allow the cardholder to interact or communicate with the system, such as, for example, a charge card, credit card, debit card, prepaid card, telephone card, smart card, magnetic stripe card, bar code card, authorization/ access code, PIN number, Internet code and/or the like. Thus, the cardholder may include a person who is simply in possession of an authorization or account code. Moreover, communication between the cardholder and the system preferably exists by any suitable communication means, such as, for example, a telephone network, Intranet, Internet, point of interaction device (point of sale device, personal digital assistant, cellular phone, kiosk, etc.), on-line communications, off-line communications and/or the like. One skilled in the art will also appreciate that, for security reasons, any databases, systems or components of the present invention may consist of any combination of databases or components at a single location or at multiple locations wherein each database or system includes various security features such as firewalls, access codes, encryption, compression and/or the like.

Figure 3A:
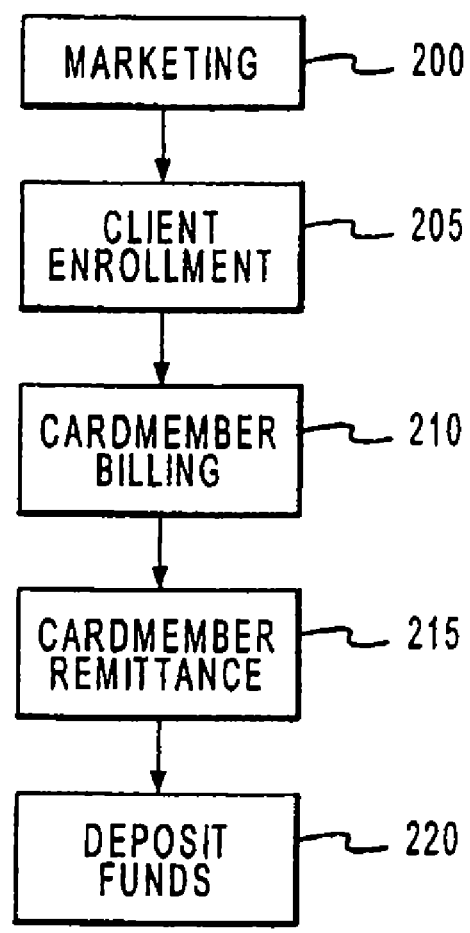
FIG. 3A is an exemplary high-level process flow diagram showing a general method in accordance with one embodiment of the present invention.

The general steps in the operation of a preferred system are illustrated by the flowchart of FIG. 3A. An investment broker system 20 markets the benefits of the system to cardholders (step 200). An interested cardholder enrolls in the system and suitably appoints the charge card administrator as a processing agent to collect and promptly remit to the investment broker system 20 the cardholder's voluntary, periodic payments of cardholder funds (wherein the cardholder funds do not include a required repayment of a loan from the charge card administrator) for investment into preselected mutual fund shares, fixed annuities, variable annuities, CDs, insurance, certificates, equities and/or the like (step 205). Billing system 10 (FIG. 2) preferably distributes a billing statement at the end of each month, wherein the statement includes all of the charges for that month and a reminder to remit an additional dollar amount for the preselected investments (step 210). The cardholder then sends a single payment for the charges and the investments to the charge card administrator (step 215). After receiving the payment, the billing system 10 appropriately unbundles the payment and distributes the remitted payment to card account 12 to satisfy the charges and/or to the investment broker system 20 to purchase investment products (step 220).

More particularly, with reference to FIG. 2, the system preferably includes a marketing system 48 having a cardholder database 5, a billing system 10 and an investment broker system 20. Marketing system 48 is any database, software, hardware, system and/or the like suitably configured to communicate with cardholder database 5, billing system 10 and/or investment broker system 20. Marketing system 48 is also configured to analyze cardholder statistics and investment product statistics, while compiling a list of cardholders which meet predetermined criteria for solicitation. The predetermined cardholder criteria includes, for example, card type, account numbers, client card address, year of birth and solicitation codes. Marketing system 48 also preferably tracks existing cardholders' activity, investing preferences and investing patterns to further refine the client and investment product selection process. With respect to the investment products, marketing system 48 analyzes statistics for various investment products to determine the optimal investment products to offer to selected cardholders. In a preferred embodiment, marketing system 48 suitably creates an acquisition tape of preferred cardholders and investment products and transmits the acquisition tape to investment broker system 20. Marketing system 48 is preferably the American Express MID System.

Cardholder database 5 is any database, software, hardware, system and/or the like suitably configured to communicate with marketing system 48, billing system 10 or investment broker system 20 and to accept, store and transmit cardholder information. Cardholder database 5 preferably includes any information related to the cardholder including, for example, name, address, demographic information, social security number, date of birth, spending habit information, billing history information, credit history information and/or the like. In a preferred embodiment, cardholder database 5 is the American Express CIM/Legacy System.

Billing system 10 is any system, software, hardware, database and/or the like which is suitably configured to organize and print billing information and/or monitor, store, audit or obtain remittance information. Billing system 10 can be an existing billing system such as, for example, the American Express Legacy Accounts Receivable System, or can be a specially configured billing system to provide the functions of the present invention. In a preferred embodiment, billing system 10 includes card account database 12, financial events database 14, billing information database 16 and remittance information database 18. One of ordinary skill in the art will appreciate that, although billing system 10 is described as the interconnection of numerous databases, billing system 10 can be a single system or database or any combination thereof.

Card account database 12 includes any database, system, software, hardware, and/or the like suitably configured to store card account and related information. Card account database 12 may include an individual account for an individual cardholder or card account database 12 may include a plurality of card accounts for each cardholder 5 if the cardholder uses multiple cards. One skilled in the art will appreciate that card account database 12 can be an individual transaction card database, multiple transaction card databases, or a single database including transaction card information from multiple transaction card administrators. As such, card account database preferably includes appropriate security to limit access to particular transaction card information by other transaction card administrators. For example, card account database 12 may include all American Express charge card account information. Alternatively, card account database 12 may include VISA credit card account information, American Express charge card account information, MasterCard credit card information, etc.

Financial events database 14 is any database, hardware, software and/or the like which is suitably configured to communicate with card account database 12 and merchant databases in order to monitor and capture information from merchant transactions involving the charge card. In a preferred embodiment, financial events database 14 is an existing merchant charge card system, such as, for example, the American Express FINCAP system, which is suitably reconfigured to communicate with the present invention. One skilled in the art will appreciate that the present invention can alternatively include a financial events database which is specially configured to interact with the present invention.

Billing information database 16 is any database, software, hardware and/or the like which is suitably configured to monitor billing information and transmit billing information throughout the system and to cardholders. Billing information database 16 preferably communicates with remittance information database 18, card account database 12 and investment broker system 20. In a preferred embodiment, billing information database 16 includes information about each charge on a particular card by a particular cardholder. Billing information database 16 also preferably creates billing statements (see FIG. 7) wherein the information on the billing statement includes charge card information (from financial event database 14) and investment account information (from investment instruction arrangement database 22).

Remittance information database 18 is any database, software, hardware and/or the like which is suitably configured to monitor receivables and store information about monies received from cardholders in response to a billing statement. Remittance information database 18 preferably communicates with billing information database 16, investment system 20 and payment hierarchy system 19. Payment hierarchy system 19 is any system, software, hardware, database and/or the like suitably configured to divide and prioritize remitted cardholder payments based upon pre-established business rules for the sequence of distribution of the received funds. In other words, payment hierarchy system 19 allocates remitted cardholder funds among current and past due card charges in order to prevent the cardholder from defaulting on the cardholder's account.

With continued reference to FIG. 2, investment broker system 20 is any system, software, hardware, database and/or the like suitably configured to communicate with billing system 10, store information related to multiple investment products and apply remitted funds to multiple investment products based upon cardholder instructions. In a preferred embodiment, investment system 20 partially includes the American Express CAMS/CATS System for multiple variable fund and fixed fund products or the Vantage System for the limited annuity products. In a preferred embodiment, investment broker system 20 includes investment instruction arrangement database 22, payment hierarchy system 24, investment account database 40 which includes variable annuity database 42, fixed annuity database 44 and mutual fund database 46, trade information database 30, marketing information database 32 and product information database 34.

Investment instruction arrangement database 22 is any database, software, hardware, system and/or the like suitably configured to provide a set of instructions for the distribution of investment funds to the appropriate investment products and for providing remittance information for a particular investment to be included on a billing statement of a particular transaction. In a preferred embodiment, investment instruction arrangement database 22 includes, for each investment, the period in which the investment amount appears on the billing statement, the amount to be distributed, whether the distribution is a percentage of the whole investment amount or is a predetermined amount and/or the like. Investment instruction arrangement database 22 preferably communicates with investment payment hierarchy system 24, investment account database 40 and billing system 10. Investment payment hierarchy 24 is any system, database, software, hardware and/or the like suitably configured to determine the allocation of investment funds among pre-selected investment products. In a preferred embodiment, investment payment hierarchy system 24 includes a set of instructions which determines the ordering in which the investment products are populated with investment monies and, if sufficient funds do not exist, investment payment hierarchy 24 determines the amount of funding, if any, for each of the investment products.

Investment account database 40 is any system, database, software, hardware and/or the like suitably configured to communicate with investment instruction arrangement database 22. Investment account database 40 is also any database suitably configured to store investment products. "Investment products" include, for example, variable annuity products 42, fixed annuity products 44 and mutual funds products 46, but one skilled in the art will appreciate that any investment product may be available such as CDs, insurance, certificates, equities, savings accounts and the like.

Information databases 30, 32 and 34 are optional features which suitably communicate with investment instruction arrangement database 22.

Trade information database 30 preferably includes information related to a particular trade or add-on to a cardholder's account, such as, for example, the number of shares and share price. Trade information database 30 suitably informs investment instruction arrangement database 22 of a remittance into remittance database 18. Marketing information database 32 preferably includes information about a marketing campaign or effort. Product information database 34 preferably includes information regarding an investment product which is offered by the investment broker system 20.

One skilled in the art will appreciate that investment account 40 and information databases 30, 32 and 34 are exemplary and any number of such databases may or may not communicate with the present system and provide information at any process step or to any database. Moreover, third party information databases, brokers, investment products and/or the like may also communicate with the present system in order to provide the cardholder with increased information and investment opportunities. Furthermore, the cardholder can access any of the aforementioned databases through a telephone system, touchtone response system, voice response system, Internet system or any other means for accessing data.

Additionally, the aforementioned systems and databases are preferred embodiments; however, one skilled in the art will appreciate that numerous other databases and systems may suitably communicate with the present system in order to provide enhanced functionality and information resources for the charge card administrator and the cardholder. For example, the system may include additional functionality for establishing cardholder accounts, enrolling cardholders, billing cardholders, crediting cardholders for unpaid billings, establishing collection procedures, bypassing incompatible charge card functionalities (e.g., submitting unpaid amounts to collections, bypassing the authorization process, etc.), functionality for recovering from errors in transmissions or late transmissions, transferring monies to bank accounts, correcting misapplied payments and transmitting the funds back to the cardholder, processing withdrawals from the investment accounts, providing actuarial data to support reserve accounts, functionality to update name changes, address changes, card number changes and card status, reporting functionality, and the abilities to evaluate cardholder activity. The reporting capabilities include card reconciliation transmission reports, finance reports to track the number of client and the number of transactions, unprocessed transaction reports, credit adjustment reports, nonfinancial transaction reports, partial payment reports, paid more than billed reports, paid as billed reports, change request reports, file maintenance error reports and unapplied funds reports.

Figure 3B:
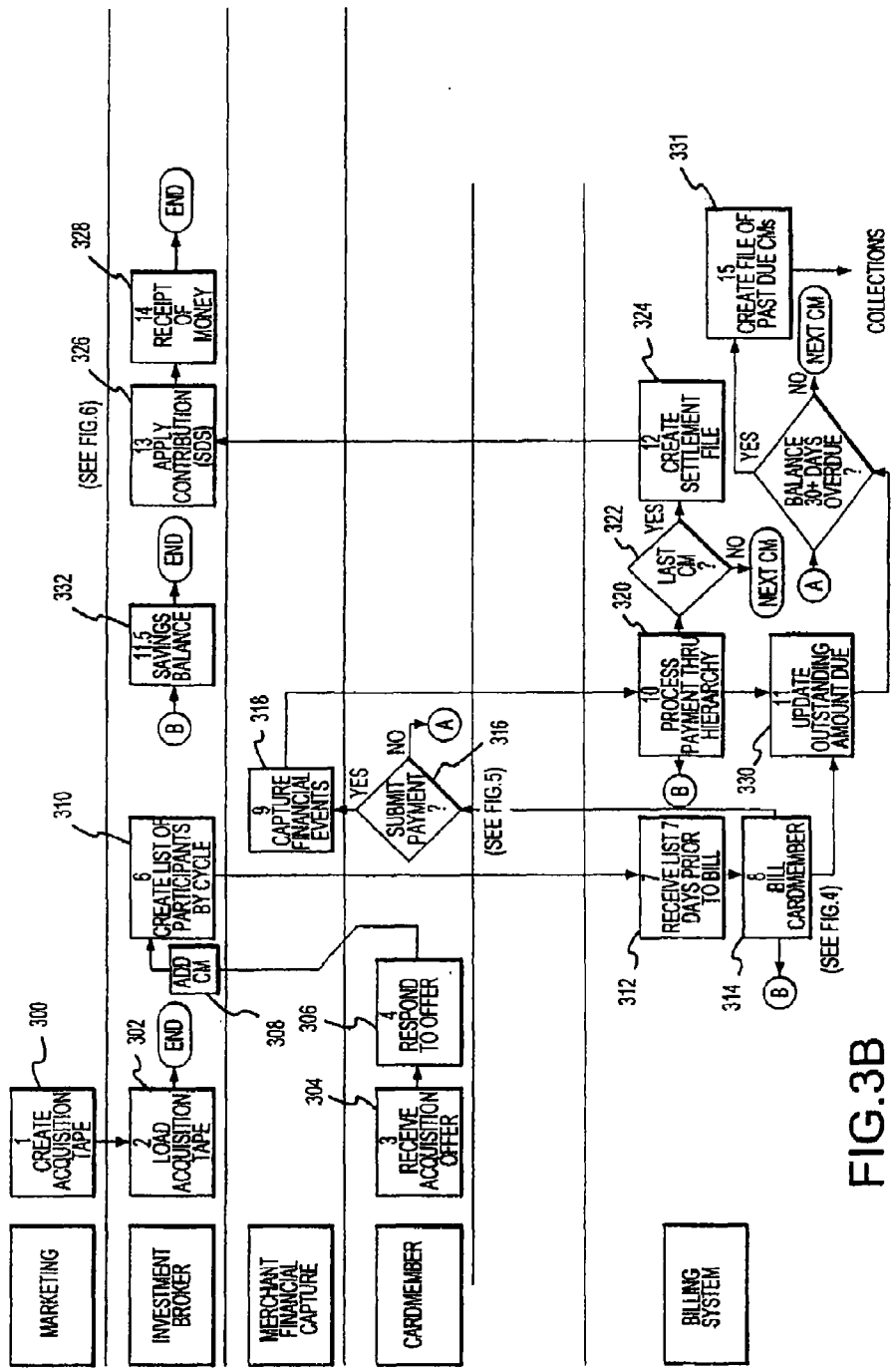
FIG. 3B is an exemplary process diagram showing a more detailed method in accordance with one embodiment of the present invention.

The operation of the system in accordance with a preferred embodiment is illustrated by the flow diagram of FIG. 3B, along with continued reference to FIG. 2. After defining and selecting particular cardholders and investment products which meet predetermined criteria, marketing system 48 suitably creates an acquisition tape (step 300) and suitably transmits the acquisition tape to investment broker system 20. Investment broker system 20 preferably loads the respective information from the acquisition tape into marketing information database 32 and product information database 34, along with updating cardholder database 5 (step 302). The system then preferably transmits an acquisition (sign-up) offer to the pre-selected cardholders (step 304), via regular mail, Internet, point of interaction device or other electronic means. If the cardholders are interested in participating in the system, the cardholders preferably respond to the offer by submitting, via regular mail, Internet, point of interaction device or other electronic means, investment instruction arrangements to the system (step 306), wherein the system stores the investment instruction arrangements for each cardholder in investment instruction arrangement database 22 while also establishing an investment account for each interested cardholder in investment account database 40 (step 308). Alternatively, any person can approach the billing system administrator or investment broker system 20, become a cardmember and participate in the present investment broker system.

The system then creates a list of cardholder participants who are within the same billing cycle (step 310) and the investment broker system 20 transmits the list of cardholders along with their individual investment instruction arrangements to billing information database 16 preferably at least seven days prior to the end of the particular billing cycle (step 312). In a preferred embodiment, the list of cardholders created by investment broker system 20 includes a file of billing statements based on the cardholder's billing cycle, wherein the number in the tenth field of the cardholder's account number preferably determines the type of billing cycle (e.g., an "8" in the tenth field of the cardholder account number instructs billing system 10 about which of the monthly billing cycles to use). The list of cardholders also preferably includes, for each cardholder, card account number, policy number, bill amount, the month the contribution represents, service establishment number, product name, an 800 number (for the cardholder to obtain more information about the investment product) and investment product service team location (informs the cardholder where the particular customer service representatives are located). With respect to a service establishment number, each investment broker system 20 is preferably considered a different "service establishment" (or company/merchant) within the system in order to simplify the incorporation and recognition of the investment system into billing system 10. Alternatively, the investment broker system 20 may be listed separately on billing statements without reference to a service establishment number.

Billing information database 16 next suitably prepares and transmits a billing statement to the cardholder, wherein the billing statement includes the aforementioned information received from investment broker system 20. At the same time the billing information is sent to billing information database 16, an extract file is transmitted to remittance database 18. More particularly, with reference to FIG. 4, investment system 20 suitably creates a list of investment product cardholders which all share a similar statement cycle (step 402). Investment system 20 then preferably assigns a particular investment product(s) within an arrangement database (an arrangement database includes multiple investment product offerings) with an active status for each statement cycle. For each cardholder on the list, the system stores additional information such as, for example, card number, date, billing amount, vendor name (such as American Express Financial Advisors Inc.), city/state, contribution period, product name and account identification number.

The system then creates a card billing file for each statement cycle, wherein the billing file consolidates all cardholders and adds a telephone number, reference number and ROC (record of charge) number for each record at the time of consolidation (step 404). After creating the card billing file, in an alternative embodiment, the system suitably generates a premium billing transmittal register which is preferably a summary by CAP (central affiliated property) number (overall company number, e.g. Walmart) and service establishment number (specific store, e.g. Walmart on 6th Street in Phoenix, Ariz.) of the number of records and amounts included on each billing cycle (step 406). The premium billing transmittal register is then suitably transmitted to billing system 10 (step 408). In a preferred embodiment, after creating the card billing file (step 404), a cardholder statement is suitably created at billing information database 16 (step 414) and the cardholder statement is subsequently mailed to the cardholder (step 416). At the same time as the billing information is transmitted, the investment broker system 20 creates an investment product extract file which includes card numbers for all investment broker system 20 card authorization arrangements having both active and inactive arrangements (step 410). The investment product extract file is then suitably transmitted to billing system 10 which runs a billing consolidator process (step 412) and then creates the cardholder statements (step 414) which are subsequently mailed to the cardholders (step 416).

In a preferred embodiment, as illustrated in FIGS. 3B, 7A and 7B, and with continued reference to FIG. 2, the investment product amount owed is incorporated into a known charge card billing statement. Thus, the cardholder receives a consolidated billing statement which includes charge card expenditures 705 along with a desired investment product amount 710 (FIG. 7A shows an exemplary billing statement summary page and FIG. 307B shows an exemplary billing statement detail page). After the cardholder is suitably billed by billing system 10 (step 314), the system stores the billing information within a savings balance database (step 332). The savings balance database is any database suitably configured to store the pending investment contribution balance of each card, wherein the balance includes the billed, received and outstanding amounts. After receiving the billing statement, the cardholder submits payment to the charge card administrator by drafting and submitting any suitable negotiable instrument to the charge card administrator. The cardholder may receive the billing statement through regular mail, Internet or other electronic means and the cardholder may remit payment via similar means. Upon remittance of the payment to the charge card administrator, the remittance information is suitably inputted and stored in remittance information database 18 (step 316).

The received payment is suitably unbundled by processing the payment through payment hierarchy 19 (step 320) to determine the appropriate dollar amount per client to be applied to the appropriate financial events (step 318) and investment products. The financial event allocation is determined by an analysis of the financial capture information, wherein the financial capture information represents the merchant charges incurred by the cardholder. The financial event database 14 captures information from any system suitably configured to retrieve, sort and store financial event information, such as, preferably the American Express FINCAP system. Payment hierarchy 19 suitably determines any outstanding amounts due (step 330) and creates a settlement file of all cardholders (step 324) which includes the appropriate allocation of the cardholders' remitted funds. In other words, billing system 10 reviews the remitted amount from each cardholder (step 322), then consolidates, preferably each day, all remitted amounts into a single settlement file which is transmitted to investment broker system 20. As discussed above, prior to beginning the investment arrangement with the charge card administrator, the cardholders provide investment instruction arrangements for the specific investment products and the amount they intend to invest on a monthly basis to investment instruction arrangement database 22. Based upon the previously submitted instructions stored in investment instruction arrangement database 22, investment broker system 20 allocates the remitted amounts to the appropriate investment product account 40 (step 326).

With respect to the outstanding financial event amounts due from each cardholder (step 330) in a typical billing cycle, billing system 10 preferably creates a file of past due cardholders (step 331) and transmits the file to a suitable collections system, such as, for example, the American Express TPNS collections system, which communicates with the cardholder to appropriately resolve the past due accounting issues. With respect to investment funds, investment system 20 communicates with billing system 10 to stop the collection process because the investment funds are preferably not required payments.

Figure 5:
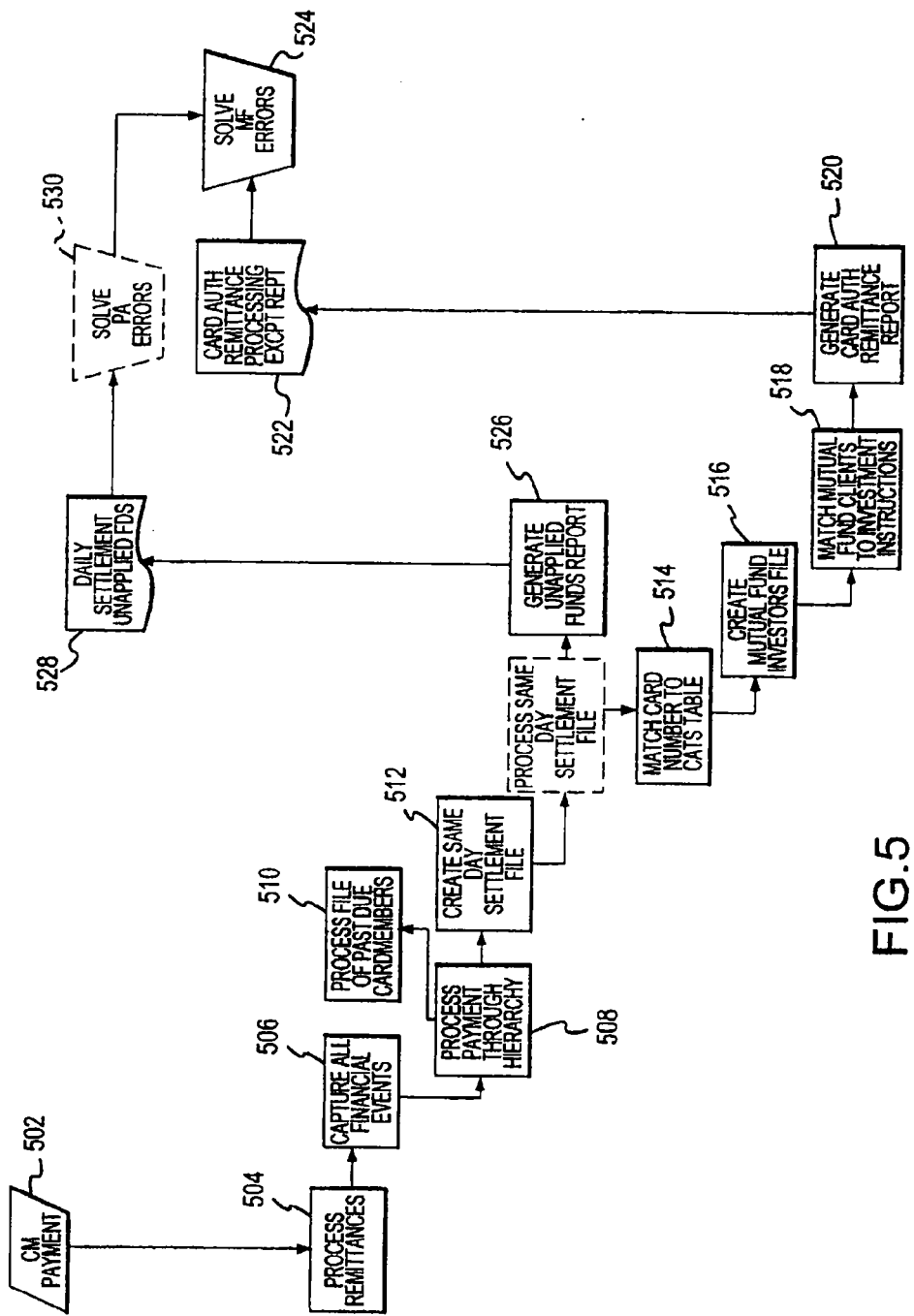
FIG. 5 is an exemplary flow diagram showing a more detailed method of the cardholder remittance process for mutual funds in accordance with one embodiment of the present invention.

More particularly, with reference to FIG. 5, after the cardholder submits payment to billing system 10 (step 502), billing system 10 suitably processes the remittances (step 504) through payment hierarchy system 19 which applies a payment hierarchy to the remitted funds to determine the ordering for applying payments to the outstanding amounts owed to the financial events (step 508). The financial events are card charges at merchants which were previously incurred by the cardholders and which were previously captured by billing system 10 and preferably stored in financial event database 14. If the remitted funds are insufficient to satisfy the amount owed to merchants for the financial events, billing system 10 suitably processes a file of past-due cardholders (step 510) wherein the file of past-due cardholders is forwarded to a collections system.

In a preferred embodiment of the present invention, investment broker system 20 includes its own investment payment hierarchy system 24. Thus, while payment hierarchy system 19 processes the remitted payment with respect to the financial events located in financial event database 14, investment payment hierarchy system 24 processes the remitted payments to determine the allocation of funds to the preselected investment products. For example, if the cardholder instructions include $50 to Mutual Fund A and $25 to Annuity B each month, yet the cardholder only submits an additional $20, investment payment hierarchy may apply $15 to Mutual Fund A and $5 to Annuity B.

However, if the cardholder submitted insufficient funds to satisfy the intended allocation to the investment products, the collections system of billing system 10 will not include the cardholder in the past-due cardholder file (as long as the remitted funds satisfy the amounts owed for the financial events). In other words, because participation in the investment products is voluntary, if the cardholder does not submit a sufficient amount of additional funds to satisfy the intended allocation to the investment products, the collections system does not submit the cardholder account to the collections system and the system does not charge interest for the unpaid investment funds.

Moreover, the collections system preferably monitors the non-payment of investment funds. Particularly, if the cardholder does not submit the selected investment funds for a predetermined number of days, preferably 60 days, the collections system will remove the cardholder from card account 12 of the billing system 10 and the billing statement will no longer include a reminder to submit the investment funds. In a preferred embodiment, the collections system is the American Express TPNS system.

While payment hierarchies 19 and 24 suitably apply the appropriate business rules to determine the hierarchy of payments to the specific financial events and investment products, respectively, one of ordinary skill in the art will appreciate that payment hierarchy systems 19 and 24 include any system suitably configured to determine the appropriate allocation of remitted funds to internal charges or products and/or to third party charges or products. In an alternative embodiment, the present system may charge a fee to the cardholder for applying the remitted funds to third party investment products.

For the cardholder investment products in which sufficient remittances are received, the billing system 10 creates a settlement file, preferably within the same day as the receipt of funds, which preferably includes the card account number, remittance amount and/or credit amount (step 512). The billing system 10 then transmits the settlement file to investment broker system 20 which, preferably on the next day, matches the card account number to the preselected investment products within investment instruction arrangement database 22 to verify that the investment products were preselected. The newly-created investment product file is passed to the investment account database 40 to apply the remittances to the individual product accounts. The remittances are then matched to the investment instruction arrangements within investment instruction arrangement database 22 by matching the card number to the investment broker system 20 account identification and matching the remittance amount to the percent allocation (step 518). Additionally, any credit amount which exists is preferably identified for future reporting. The system then applies the remitted funds to the active (selected) arrangements within investment instruction arrangement database 22 (step 514).

An investment product file which includes a date, card number, remittance amount or credit amount for each record is preferably created within the arrangements of investment instruction arrangement database 22 (step 516). Investment broker system 20 then generates a card authorization remittance report (step 520) and the report is cross-checked for unmatched card numbers, remittances, credits and debits (step 522). If any errors exist, investment broker system 20 resolves any exceptions on the card (step 524) and provides an Authorization Remittance Processing Exception Report.

Moreover, after investment broker system 20 receives the settlement file from billing system 10, investment broker system 20, if appropriate, generates an unapplied funds report and/or an error report (step 526) In a preferred embodiment, the unapplied funds settlement report is transmitted to investment broker system 20 to suitably inform investment broker system 20 of the investment fund errors and allows investment broker system 20 to resolve the investment fund errors (step 528 and 530). In a preferred embodiment, the settlement file is comprised of two files which each include a record for each remittance, wherein the record preferably includes the card number, remittance amount and service establishment number.

With momentary reference to FIG. 3B, after investment payment hierarchy system 24 determines the appropriate allocation of the investment funds to particular investment products, investment instruction arrangement database 22 organizes the particular cardholder investment product purchase request in an arrangement database. Based upon the arrangement database within the investment instruction arrangement database 22, the system trades or applies cardholder investment funds to create orders for investment products, execute trades from the investment funds, and apply the purchase payments to the appropriate investment product (step 326). After applying the contribution requests to the appropriate investment product, the investment products are funded with the money from the consumer remittance (step 328).

Figure 6:
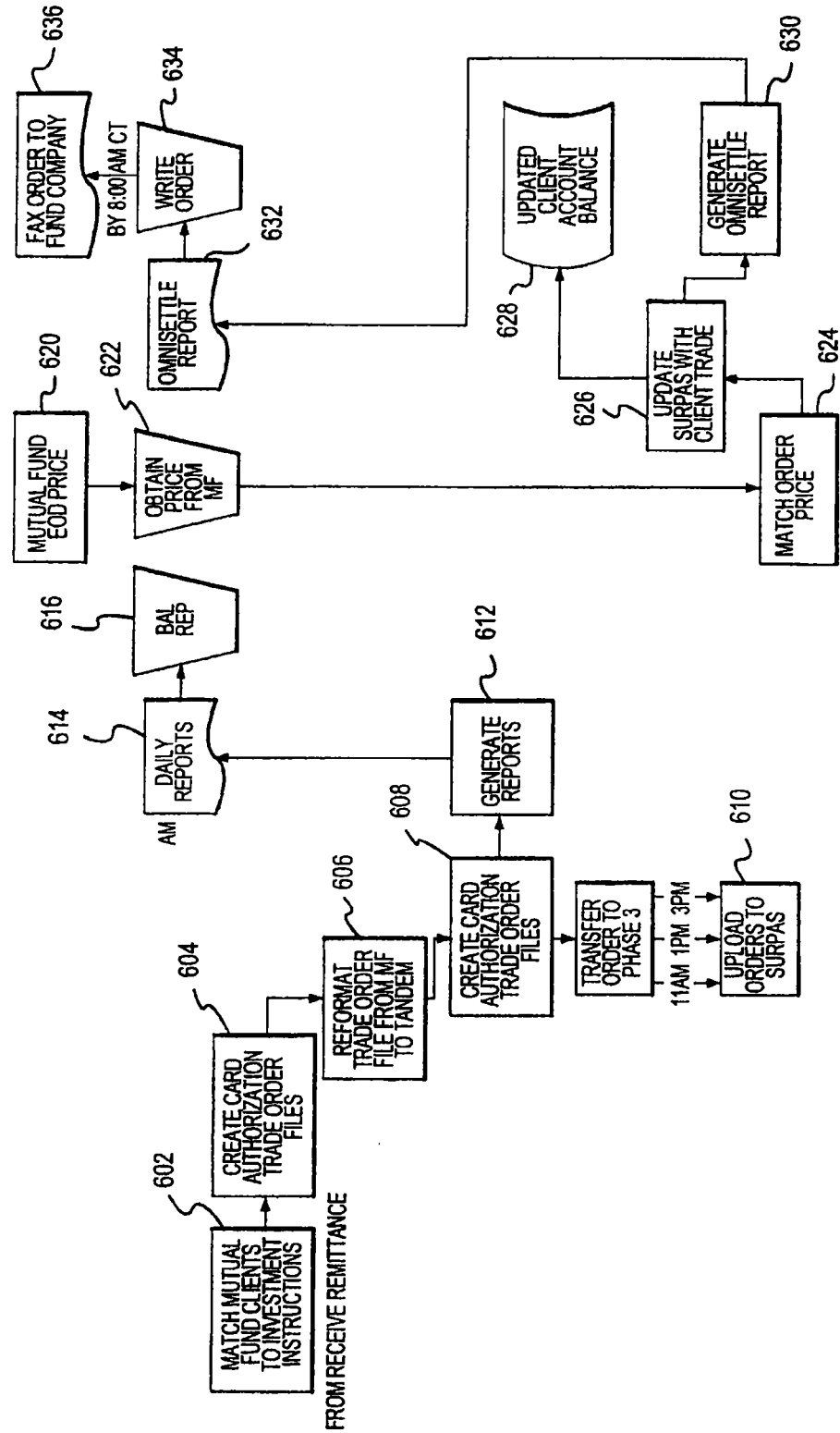
FIG. 6 is an exemplary flow diagram showing a more detailed method of the create order and execute order process for mutual funds in accordance with one embodiment of the present invention.

More particularly, with reference to FIG. 6, upon receipt of the settlement file from billing system 10, investment broker system 20 utilizes the cardholder information within the settlement file to suitably obtain the particular investment instruction arrangements for each cardholder from investment instruction arrangement database 22 (step 602). Upon matching the cardholders with the investment instruction arrangements, investment broker system 20 suitably creates trade order files which preferably include a date, investment broker system 20 identification, ticker symbol, order amount and summary of total dollars (step 604). In a preferred embodiment, the trade order files are reformatted to allow processing by a suitable trading system (step 606), wherein the trading system communicates with the present invention. The orders are further supplemented with the appropriate trade information, such as, for example, an identification of the investment trade, a translation from the code account to a sweep fund, and an identification of the order as a qualified or non-qualified order (step 608). In an alternative embodiment, the no-load or other non-proprietary orders (investment products not offered by the investment broker system 20) are provided with a routing code to allow the order to be uploaded to another external system for further processing (step 610).

Preferably, after investment broker system 20 creates the trade order file, the system generates reports such as, for example, card authorization order transactions, IRA cash transactions, non-IRA cash transactions, daily activity file counts, and/or the like (step 612). The reports are then suitably transmitted to billing system 10 wherein billing system 10 allows the reports to be suitably available to billing system management (step 614). Alternatively, the reports may be available to the cardholder via regular mail, facsimile, Internet or any other electronic means. The daily reports generated by the system also include a balance of the cardholder's investment funds (step 616). In a preferred embodiment, to create the orders, execute the orders and execute the trades, investment broker system 20 includes any combination of systems suitably configured to perform the aforementioned functions such as, for example, the American Express Phase 3 and SURPAS systems which use the Tandem code and the SPTG (Special Products Technical Group) system for translating mainframe code to Tandem code.

With respect to the pricing of the investment products, investment broker system 20 or a third party investment product company suitably establishes an end-of-the-day price for the investment product (step 620) and investment broker system 20 suitably obtains the investment product price from the third party investment product company (step 622). The price is obtained manually, but one skilled in the art will appreciate that the price may be obtained automatically via software, electronic transfer or other mode of transmission. Investment broker system 20 suitably matches the previously created trade order file with the investment product price (step 624). The system then preferably updates the trade order file with the price of the client trade (step 626) and appropriately updates the client account balance (step 628) within investment account database 40. Additionally, investment broker system 20 suitably generates a settlement report (step 630) and suitably transmits the report to investment broker system 20 (step 632) which, in turn, writes the order (step 634) and suitably transmits the order to the investment product company, preferably before the trading market opens, to allow the investment product company to execute the trade (step 636).

One skilled in the art will appreciate that the transmission of the reports and orders is executed in any appropriate manner for transferring the information including manual reporting, facsimile, electronic reporting or other suitable mode of transmission. Moreover, in an alternative embodiment, the aforementioned functions for providing reports, obtaining investment product information, or writing orders can be accomplished by any third party business unit such as, for example, a investment broker system 20 house. In a preferred embodiment, depending on securities regulations, trade information database 30 prices the variable investment product, such as mutual funds, within 24 hours after investment broker system 20 receives the cardholder funds. In a preferred embodiment, investment broker system 20 receives the settlement file and processes the file into trade orders and credits the card member account. The reconciliation report discussed above is preferably faxed to the cardholder on the morning of day 3 (three days from receiving the cardholder remittance). To conform with the appropriate securities regulations, all of the aforementioned transmission steps may be subjected to specific time of day turnaround requirements.

One skilled in the art will appreciate that, after the remittance process (step 215), the system may incorporate any number of capabilities and functionalities which suitably enhance efficiencies and customer service. For example, the system may confirm investment product orders and trades, reconcile account balances, provide client statements, incorporate tax reporting summaries and suggestions, generate refund checks, reconcile money transfer amounts, process investment product withdrawals, wire transfer money and/or redeem mutual fund shares. Additionally, the system may provide manual or automatic services for managing client inquiries and requests and maintaining client data. Furthermore, cardholders may make withdrawals and changes to their investment broker system 20 accounts or terminate participation in the service by calling a toll free number, submitting an Internet request or any other suitable communication means. If cardholders wish to change the amount they wish to invest, the cardholders can simply communicate with the investment broker system 20 through the normal investment process which may include, for example, calling a customer service representative, faxing requests to the broker, entering changes electronically through the Internet or any other suitable communication means.

Furthermore, since each investment is voluntary, non-payment of the investment amount will not affect the cardholder's ability to charge on the charge card and the unpaid investment amount will not accrue interest or other charges. Moreover, the cardholders are not exposed to any risk of loss by using the charge card administrator as a processing agent for their intended investment amounts because, in a preferred embodiment, the investment broker system 20 takes full responsibility for the safety of the funds from the time the intended investment amount is received by the charge card administrator until the time of investment. Thus, as discussed above, after receiving the billing statement each month, the cardholder sends a single check for both regular charge card purchases and for the purchase of the investment products. However, since the payment contribution is voluntary, the cardholder can choose not to pay without an impact to their overdue account balance.

Particularly, the charge card administrator preferably does not hold or control the remitted investment funds because the charge card administrator only handles the funds pursuant to the cardholders' direction to transfer the funds. The billing system deposits the funds into the investment account database 40 based on the cardholder's instructions in investment instruction arrangement database 22. Moreover, the charge card administrator will not forward any funds until the remitted investment funds are received by the charge card administrator. In other words, the cardholder does not charge the investments to his charge card account; rather, the cardmember remits the investment funds to the charge card administrator which in turn remits the investment funds to the investment broker system 20. Additionally, as discussed above, in order to avoid any "requirement" to submit investment product payments, the portion of the remitted amount to be applied to the investment product bypasses the regular charge card authorization process, and thus, if the investment product funds are not received, the system will not transmit the cardholder account to the collections system.

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

We claim:

1. An administrative system for funding at least one investment product including:
   a charge card billing system capturing financial event information wherein said billing system comprises:
   a card account database including user accounts;
   a billing information database including information about user billings and to provide periodic statements related to previously established financial events;
   a financial events database including information about said previously established financial events associated with a user;
   a remittance database including information about user combined remittances of user funds, wherein said combined remittances include a portion of said user funds to satisfy debts charged to said user from said previously established financial events disclosed in said periodic statement and a portion of said user funds for at least one investment product as investment funds, wherein said investment funds were not previously invested, and without said charge card billing system loaning said investment funds to said user;
   a payment hierarchy system establishing rules for distributing said combined remittances to said previously established financial events and to an investment brokerage system configured to facilitate said investment; and,
   an investment broker system in communication with said billing system wherein said investment broker system comprises:
   an investment instruction arrangement database including user investment instruction information;
   an investment account database including said at least one investment product; and, an investment payment hierarchy system establishing rules for distributing said user funds to said at least one investment product.

2. The administrative system of claim 1, wherein said at least one investment product includes at least one of a fixed annuity, variable annuity, CD, insurance, certificate, equity and mutual fund.

3. The administrative system of claim 1, wherein said charge card billing system avoids a collections process upon remittance of sufficient said user funds for said financial events and insufficient investment funds.

4. The administrative system of claim 1, wherein said at least one investment product is pre-selected by said user.

5. The administrative system of claim 1, wherein said billing system and said investment broker system are accessed via at least one of a telecommunications linkage, facsimile, Internet and a point of interaction device.

6. The administrative system of claim 1, wherein said financial events database including information about previously established financial events associated with a user, further facilitates:
receiving an account number and purchase amount from said user to facilitate user purchase from a merchant;
authorizing said account number and said purchase amount;
providing an approval code to said merchant, wherein said approval code is associated with said account number and said purchase amount;
receiving a request from said merchant for payment of said purchase amount, wherein said request includes said approval code; and,
sending said periodic statement to said user, wherein said periodic statement includes said purchase amount.

7. A method for funding at least one investment product including the steps of:
providing a charge card billing system through which a user charges financial events;
capturing, using said billing system, previously established financial event information;
providing an investment broker system in communication with said billing system, wherein said investment broker system includes multiple investment products through which said user can select at least one investment product for purchase;
billing said user via a periodic statement for said previously established financial events related to said user;
accepting, by said charge card billing system, a combined remittance of user funds from said user, said accepting is in response to said periodic statement;
a portion of said combined remittance defined as said user funds to satisfy debts charged to the user from said previously established financial events disclosed in said periodic statement, and said user funds to be applied to said at least one investment product as investment funds, wherein said investment funds were not previously invested, and without said charge card billing system loaning said investment funds to said user;
applying hierarchy rules to said combined remittance of said user funds to determine a portion of said user funds to be allocated by said investment broker system to said at least one investment product;
transferring said investment funds to said investment broker system;
applying payment hierarchy rules to said investment funds; and,
distributing said investment funds to said at least one investment product in accordance with said payment hierarchy rules.

8. The method of claim 7, wherein said at least one investment product includes at least one of a fixed annuity, variable annuity, CD, insurance, certificate, equity and mutual fund.

9. The method of claim 7, wherein said step of accepting a combined remittance avoids a collections process upon remittance of insufficient investment funds.

10. The method of claim 7, wherein said investment broker system allows said user to select said at least one investment product for purchase prior to accepting a combined remittance.

11. The method of claim 7, wherein any of the steps are preformed over at least one of a telecommunications linkage, facsimile, the Internet and a point of interaction device.

12. The method of claim 7, wherein billing said users via a periodic statement for previously established financial events includes:
receiving an account number and purchase amount from said user to facilitate user purchase merchant;
authorizing said account number and said purchase amount;
providing an approval code to said merchant, wherein said approval code is associated with count number and said purchase amount;
receiving a request from said merchant for payment of said purchase amount, wherein said includes said approval code; and,
sending said periodic statement to said user, wherein said periodic statement includes said purchase amount.

* * * * *

UNITED STATES PATENT AND TRADEMARK OFFICE
CERTIFICATE OF CORRECTION

| | | |
|---|---|---|
| PATENT NO. | : 7,313,543 B1 | Page 1 of 1 |
| APPLICATION NO. | : 09/415632 | |
| DATED | : December 25, 2007 | |
| INVENTOR(S) | : Suzanne P. Crane et al. | |

It is certified that error appears in the above-identified patent and that said Letters Patent is hereby corrected as shown below:

On the Title page, section (75) Inventors, please delete "Rockwell" and insert therefor --Rockell--.

In Column 16, line 32, please delete "preformed" and insert therefor --performed--.

In Column 16, line 38, please delete "merchant" and insert therefor --from a merchant--.

In Column 16, line 42, please delete "count" and insert therefor --said account--.

In Column 16, line 46, please delete "includes" and insert therefor --request includes--.

Signed and Sealed this

Second Day of September, 2008

JON W. DUDAS
*Director of the United States Patent and Trademark Office*